United States Patent
Tsai et al.

(10) Patent No.: US 9,130,498 B2
(45) Date of Patent: Sep. 8, 2015

(54) FAN SYSTEM—SINGLE-PHASE DC MOTOR CONTROL CIRCUIT AND CONTROL METHOD THEREOF

(71) Applicant: ANPEC ELECTRONICS CORPORATION, Hsinchu (TW)

(72) Inventors: Ming-Jung Tsai, Changhua County (TW); Ching-Sheng Li, Hsinchu County (TW); Chia-Tai Yang, Tainan (TW)

(73) Assignee: Anpec Electronics Corporation, Hsinchu (TW)

( * ) Notice: Subject to any disclaimer, the term of this patent is extended or adjusted under 35 U.S.C. 154(b) by 119 days.

(21) Appl. No.: 14/102,788

(22) Filed: Dec. 11, 2013

(65) Prior Publication Data

US 2015/0061551 A1     Mar. 5, 2015

(30) Foreign Application Priority Data

Sep. 2, 2013     (TW) .............................. 102131533 A (51) Int. Cl.
*H02K 33/00* (2006.01)
*H02P 25/04* (2006.01)
*H02P 7/29* (2006.01)

(52) U.S. Cl.
CPC . *H02P 25/04* (2013.01); *H02P 7/29* (2013.01)

(58) Field of Classification Search
CPC ........ H02P 23/0027; H02P 6/142; H02P 6/18
See application file for complete search history.

(56) References Cited

U.S. PATENT DOCUMENTS

2014/0239854 A1*     8/2014     Suzuki .......................... 318/35

* cited by examiner

*Primary Examiner* — Karen Masih
(74) *Attorney, Agent, or Firm* — Rosenberg, Klein & Lee (57) ABSTRACT

A signal-phase DC motor control circuit is disclosed. The signal-phase DC motor control circuit includes a logic circuit, a switching circuit and a driving circuit. The logic circuit transmits a first logic signal, a second logic signal, a third logic signal and a forth logic signal. The switching circuit transmits a first direction driving signal according to a PWM signal and the first logic signal, and transmits a second direction driving signal according to the PWM signal and the second logic signal. The driving circuit transmits a first output signal according to the first direction driving signal and the fourth logic signal, and transmits a second output signal according to the second direction driving signal and the third logic signal. The first output signal and the second output signal are positive half-wave sinusoidal wave, and the phase difference between the first output signal and the second output signal is 180 degrees.

20 Claims, 10 Drawing Sheets

FAN SYSTEM—SINGLE-PHASE DC MOTOR CONTROL CIRCUIT AND CONTROL METHOD THEREOF

BACKGROUND OF THE INVENTION

1. Field of the Invention

The instant disclosure relates to a fan system; in particular, to a fan system, a single-phase DC motor control circuit and control method thereof able to smoothing current of the single-phase DC motor.

2. Description of Related Art

A single-phase DC motor has been widely used in many electronic products, such as a personal computer, an electric shaver, a copier, a projector a blender and other kind of low voltage electronic products. With the advancement of technology, demand for personal computer with high performance is also increased continuously. For a personal computer with high performance, temperature of a host is easy to rise because increase of the operation speed central processing unit in the unit time. Therefore, the personal computer of new generation needs to use fan with the single-phase DC motor for cooling, and thus fan with the single-phase DC motor plays a decisive role in the miniature heat-dissipation fan system. For the above reasons, it is important to provide a circuit and control method thereof for stabilizing operation of the single-phase DC motor.

Figure 1:
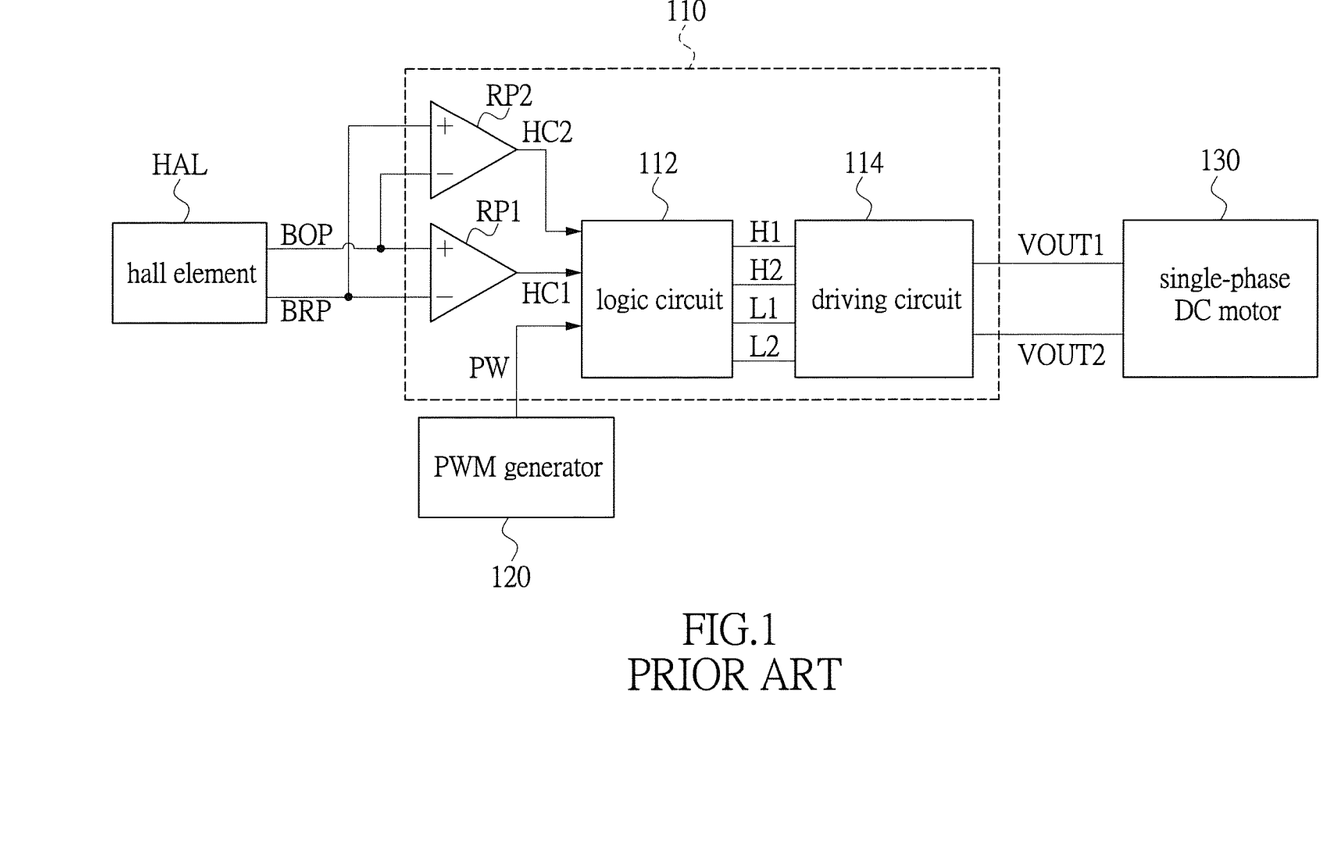
FIG. 1 shows circuit block schematic view of the control circuit of the single-phase DC motor in the prior art.
Figure 2:
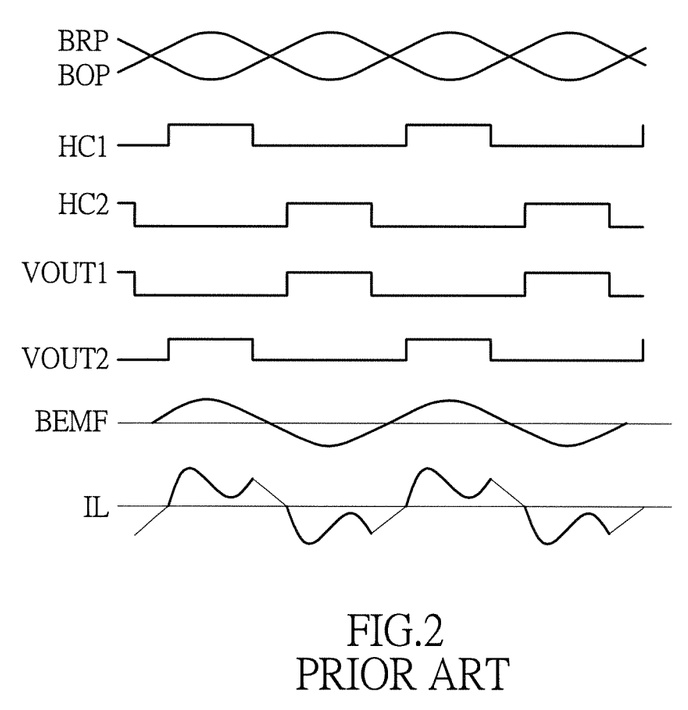
FIG. 2 shows waveform schematic view of the output signal in FIG. 1.

Referring to FIGS. 1 and 2, FIG. 1 shows circuit block schematic view of the control circuit of the single-phase DC motor in the prior art. FIG. 2 shows waveform schematic view of the output signal in FIG. 1. The control circuit of the single-phase DC motor senses a magnetic pole position of an inner rotator of the single-phase DC motor 130 through utilizing a hall element HAL, and accordingly generate a first sinusoidal wave signal BOP and a second sinusoidal wave signal BRP. After the first sinusoidal wave signal BOP and the second sinusoidal wave signal BRP are transmitted to the comparator RP1 and RP2, the comparator RP1 and RP2 respectively outputs hall signals HC1 and HC2 according to a comparison operation. Next, the logic circuit 112 receives a pulse modulation signal PW generated from the external PWM generator 120 and the hall signals HC1 and HC2 so as to respectively output the switch signal H1,H2,L1 and L2 for controlling switched-on or switched-off state of each switch unit (not shown) in the driving circuit 114. Afterwards, the driving circuit 114 alternatively outputs the first output signal VOUT1 and the second output signal VOUT2 to the single-phase DC motor 130 for making the single-phase DC motor 130 rotate.

However, when the single-phase DC motor 130 rotates, a BEMF must be generated in the single-phase DC motor 130, wherein polarity of the BEMF is opposite to that of the applied voltage. Therefore, a current flowing through the single-phase DC motor 130 may be affected by the BEMF, so that a current flowing through the single-phase DC motor 130 may generate change correspondingly, e.g. waveform of saddle-type current shown in FIG. 2. Accordingly, in the phase-changing duration of outputting the first output signal VOUT1 and the second output signal VOUT2 (i.e. voltage level of the hall signals HC1 and HC2 are low voltage level), the current flowing through the single-phase DC motor 130 may be change sharply (e.g. higher tail current value of the saddle-type current). Current of sharply changing will affect operation of the single-phase DC motor 130, so as to generate mechanical noise when the single-phase DC motor 130 rotates

SUMMARY OF THE INVENTION

The instant disclosure provides a single-phase DC motor control circuit. The single-phase DC motor control circuit comprises a logic circuit, a switching circuit and a driving circuit. The logic circuit is connected to a phase-changing signal for detecting voltage level of the phase-changing signal and outputting a first logic signal, a second logic signal, a third logic signal and a fourth logic signal, wherein phase of the first logic signal is opposite to that of the second logic signal. The switching circuit is connected to the logic circuit for receiving a pulse width modulation signal, the first logic signal, the second logic signal, wherein the switching circuit generates a first direction driving signal according to the pulse width modulation signal and the first logic signal, and generates a second direction driving signal according to the pulse width modulation signal and the second logic signal. The driving circuit is connected to the logic circuit and the switching circuit for receiving the first direction driving signal and the fourth logic signal and accordingly transmits a first output signal to a single-phase DC motor, and the driving circuit receives the second direction driving signal and the third logic signal and accordingly transmits a second output signal to the single-phase DC motor. The first output signal and the second output signal are sinusoidal signal with positive half-wave, and phase difference between the first output signal and the second output signal is 180 degrees.

In an embodiment of the instant disclosure, the single-phase DC motor control circuit comprises a positive full-wave generator, a triangular wave generator and a first comparator. The positive full-wave generator outputs a positive full-wave signal, wherein waveform of the positive full-wave signal is sinusoidal wave. The triangular wave generator outputs a triangular wave signal, wherein amplitude of the triangular wave signal is larger than or equal to that of the positive full-wave signal. The first comparator is connected to the positive full-wave generator and the triangular wave generator for receiving the positive full-wave signal and the triangular wave signal, wherein the first comparator compares the positive full-wave signal with the triangular wave signal so as to the pulse width modulation signal.

In an embodiment of the instant disclosure, wherein when voltage level of the first logic signal is high voltage level, phase of the first direction driving signal is opposite to that of the pulse width modulation signal; and when voltage level of the first logic signal is low voltage level, voltage level of the first direction driving signal is high voltage level.

In an embodiment of the instant disclosure, wherein when voltage level of the second logic signal is high voltage level, phase of the second direction driving signal is opposite to that of the pulse width modulation signal; and when voltage level of the second logic signal is low voltage level, voltage level of the second direction driving signal is high voltage level.

In an embodiment of the instant disclosure, wherein waveform of the first logic signal is equal to that of the fourth logic signal, and waveform of the second logic signal is equal to that of the three logic signal.

In an embodiment of the instant disclosure, wherein when voltage level of the phase-changing signal is low voltage level, voltage level of the first and fourth logic signal is high voltage level so that phase of the first direction driving signal is opposite to that of the pulse width modulation signal and the driving circuit outputs the first output signal; and when phase of the phase-changing signal is high voltage level, voltage level of the second and the third logic signal is high voltage level so that phase of the second direction driving signal is opposite to the pulse width modulation signal and the driving circuit outputs the second output signal.

In an embodiment of the instant disclosure, the switching circuit comprises a first NAND gate and a second NAND gate. Input terminal of the first NAND gate are respectively connected to the first comparator and the logic circuit so as to receive the pulse width modulation signal and the first logic signal respectively, and output terminal of the first NAND gate outputs the first direction driving signal to the driving circuit. Input terminal of the second NAND gate are respectively connected to the first comparator and the logic circuit so as to receive the pulse width modulation signal and the second logic signal respectively, and output terminal of the second NAND gate outputs the second direction driving signal to the driving circuit.

In an embodiment of the instant disclosure, the driving circuit comprises a first up-bridge transistor, a second up-bridge transistor, a first down-bridge transistor and a second down-bridge transistor. A source of the first up-bridge transistor is connected to a system voltage, and a gate of the first up-bridge transistor is connected to output terminal of the first NAND gate so as to receive the first direction driving signal and accordingly determines switched-on or switched-off state. A source of the second up-bridge transistor is connected to the system voltage, and a gate of the second up-bridge transistor is connected to output terminal of the second NAND gate so as to receive the second direction driving signal and accordingly determines switched-on or switched-off state. A drain of the first down-bridge transistor is connected to a drain of the first up-bridge transistor, a gate of the first down-bridge transistor is connected to the logic circuit so as to receive the third logic signal and accordingly determines switched-on or switched-off state, and a source of the first down-bridge transistor is connected to a ground voltage. A drain of the second down-bridge transistor is connected to a drain of the second up-bridge transistor, a gate of the second down-bridge transistor is connected to the logic circuit so as to receive the fourth logic signal and accordingly determines switched-on or switched-off state, and a source of the second down-bridge transistor is connected to the ground voltage.

In an embodiment of the instant disclosure, wherein when voltage level of the phase-changing signal is low voltage level, there is a first current channel generated between the first up-bridge transistor and the second down-bridge transistor and the drain of the first up-bridge transistor outputs the first output signal; and when voltage level of the phase-changing signal is high voltage level, there is a second current channel generated between the second up-bridge transistor and the first down-bridge transistor and the drain of the second up-bridge transistor outputs the second output signal.

In an embodiment of the instant disclosure, the single-phase DC motor control circuit further comprises a second comparator. The second comparator is connected between a hall element and the logic circuit, and the second comparator receives a first sinusoidal wave signal and a second sinusoidal wave signal, and compares the first sinusoidal wave signal with the second sinusoidal wave signal so as to output the phase-changing signal, wherein phase of the first sinusoidal wave signal is opposite to that of the second sinusoidal wave signal and the first and the second sinusoidal wave signal are outputted from the hall element.

In an embodiment of the instant disclosure, wherein the positive full-wave generator receives an amplitude modulation signal and accordingly modulates amplitude of the positive full-wave signal, wherein when amplitude of the positive full-wave signal decreases, amplitude of the first output signal and the second output signal are also decrease correspondingly.

The instant disclosure another provides a control method for single-phase DC motor, used for a single-phase DC motor control circuit. The control method for single-phase DC motor comprises steps as follows: receiving a pulse width modulation signal, the first logic signal and the second logic signal through the switching circuit; generating a first direction driving signal through the switching circuit according to the pulse width modulation signal and the first logic signal, and generating a second direction driving signal through the switching circuit according to the pulse width modulation signal and the second logic signal; receiving the first direction driving signal, the second direction driving signal, the third logic signal and the fourth logic signal through the driving circuit; and transmitting a first output signal to a single-phase DC motor through the driving circuit according to the first direction driving signal and the fourth logic signal, and transmitting a second output signal to the single-phase DC motor through the driving circuit according to the second direction driving signal and the third logic signal. The first output signal and the second output signal are sinusoidal signal with positive half-wave, and phase difference between the first output signal and the second output signal is 180 degrees.

The instant disclosure another provides a fan system. The fan system comprises a single-phase DC motor control circuit, a single-phase DC motor and a fan. The single-phase DC motor control circuit outputs a first output signal and a second output signal. The single-phase DC motor is connected to the single-phase DC motor control circuit and receives a first output signal and a second output signal. The fan is connected to the single-phase DC motor. The fan system drives the single-phase DC motor so as to make the fan operate through the control method for single-phase DC motor.

In summary, the fan system, the single-phase DC motor control circuit and control method thereof provided by the instant disclosure outputs the pulse width modulation signal after comparing the positive full-wave signal and the triangular wave signal, and when voltage level of the phase-changing signal is low voltage level, the switching circuit outputs the first direction driving signal, wherein phase of the first direction driving signal is opposite to that of the pulse width modulation signal. When voltage level of the phase-changing signal is high voltage level, the switching circuit outputs the second direction driving signal, wherein phase of the second direction driving signal is opposite to that of the pulse width modulation signal. The driving circuit the first outputs first output signal with sinusoidal waveform according to the first direction driving signal and the fourth logic signal, and outputs the second output signal with sinusoidal waveform according to the second direction driving signal and the third logic signal, wherein phase difference between the first output signal and the second output signal is 180 degrees, and then the first output signal and the second output signal are transmitted to the single-phase DC motor so that output current of the single-phase DC motor is sinusoidal signal continuous and further improve phenomenon of sharply changing about saddle-type current of the single-phase DC motor in the prior art and reduce noise generated from rotation of the single-phase DC motor.

For further understanding of the instant disclosure, reference is made to the following detailed description illustrating the embodiments and examples of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the present disclosure. As used herein, the term "and/or" includes any and all combinations of one or more of the associated listed items.

[Embodiment of the Single-Phase DC Motor Control Circuit]

Figure 3:
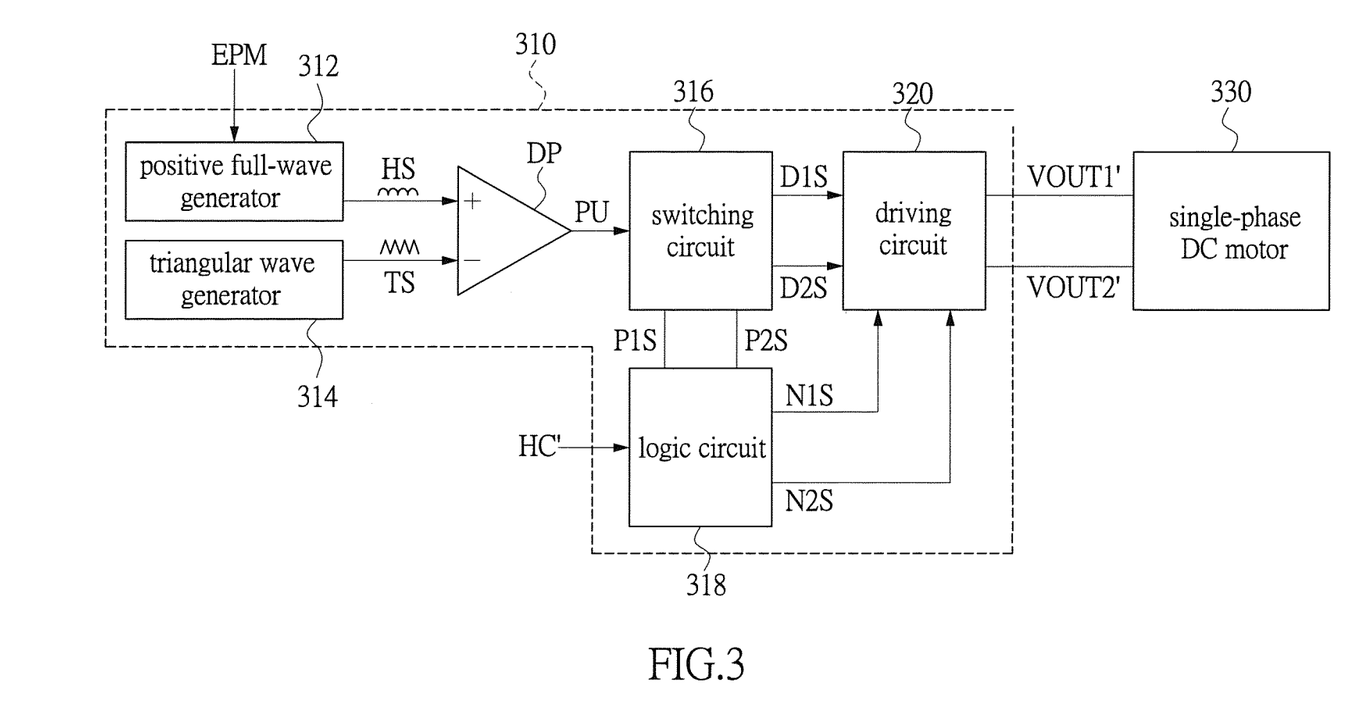
FIG. 3 shows block schematic view of the single-phase DC motor control circuit according to the embodiment of the instant disclosure.

Referring to FIG. 3, FIG. 3 shows block schematic view of the single-phase DC motor control circuit according to the embodiment of the instant disclosure. The instant disclosure makes a current of a single-phase DC motor be a continuous sinusoidal signal so as to avoid the current of a single-phase DC motor changing sharply, through a first output signal and a second output signal with waveform of the sinusoidal outputted from the driving circuit, wherein phase difference between the first output signal and the second output signal is 180 degrees. As show in FIG. 3, the single-phase DC motor control circuit 310 comprises a positive full-wave generator 312, a triangular wave generator 314, a first comparator DP, a switching circuit 316, a logic circuit 318 and a driving circuit 320. The first comparator DP is electrically connected to the positive full-wave generator 312 and the triangular wave generator 314. The switching circuit 316 is electrically connected to the first comparator DP and the logic circuit 318. The driving circuit 320 is electrically connected to the switching circuit 316 and the logic circuit 318, and the driving circuit 320 is further electrically connected to the single-phase DC motor 330.

Regarding the positive full-wave generator 312, the positive full-wave generator 312 is used for generating a positive full-wave signal HS. In another embodiment, the positive full-wave generator 312 receives an amplitude modulation signal EPM transmitted from the outside, and accordingly modulates an amplitude of the positive full-wave signal HS.

Regarding the triangular wave generator 314, the triangular wave generator 314 is used for generating a triangular wave signal TS. It is worth to be noted that, in the present embodiment, amplitude of the triangular wave signal TS is larger than or equal to amplitude of the positive full-wave signal HS.

Regarding the first comparator DP, the first comparator DP is used for receiving the positive full-wave signal HS and the triangular wave signal TS, and further compares the positive full-wave signal HS with the triangular wave signal TS. Furthermore, in the present embodiment, a positive input terminal of the first comparator DP receives the positive full-wave signal HS, and a negative input terminal of the first comparator DP receives the triangular wave signal TS, and then the first comparator DP compares the positive full-wave signal HS and the triangular wave signal TS so as to generate a pulse width modulation signal PU, wherein frequency of the positive full-wave signal HS is smaller than that of the triangular wave signal TS.

Regarding the logic circuit 318, the logic circuit 318 receives a phase-changing signal HC' and detects state of voltage level of the phase-changing signal HC', so that accordingly to output a first logic signal P1S, a second logic signal P2S, a third logic signal N1S and a fourth logic signal N2S with high voltage level or low voltage level. Furthermore, in the present embodiment, waveform of the first logic signal P1S is equal to that of the fourth logic signal N2S; which means, same voltage level. Waveform of the second logic signal P2S is equal to that of the third logic signal N1S; which means, same voltage level.

Regarding the switching circuit 316, the switching circuit 316 receives the pulse width modulation signal PU, the first logic signal P1S and the second logic signal P2S, and accordingly outputs a first direction driving signal D1S and a second direction driving signal D2S to the driving circuit 320, wherein duty cycle of the first direction driving signal D1S is different from that of the second direction driving signal D2S. In the present embodiment, when voltage level of the first logic signal P1S is high voltage level, phase of the first direction driving signal D1S is opposite to that of the pulse width modulation signal PU; when voltage level of the first logic signal P1S is low voltage level, voltage level of the first direction driving signal D1S is high voltage level. In the other hand, when voltage level of the second logic signal P2S is high voltage level, phase of the second direction driving signal D2S is opposite to that of the pulse width modulation signal PU, and when voltage level of the second logic signal P2S is low voltage level, voltage level of the second direction driving signal D2S is high voltage level.

Regarding the driving circuit 320, the driving circuit 320 receives the first direction driving signal D1S, the second direction driving signal D2S, the third logic signal N1S and the fourth logic signal N2S, and accordingly outputs the first output signal VOUT1' and the second output signal VOUT2' to the single-phase DC motor 330 correspondingly so as to make the single-phase DC motor 330 operate.

In the following description is further instruction in teaching a work mechanism of the single-phase DC motor control circuit 310.

Figure 4:
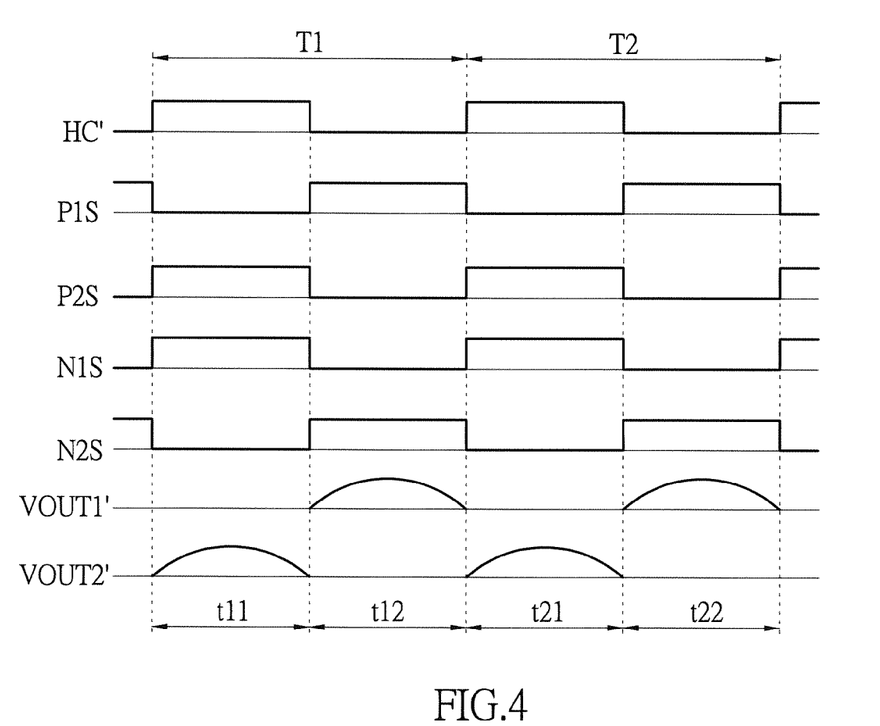
FIG. 4 shows driving waveform diagram of the single-phase DC motor control circuit corresponding to FIG. 3 according to the embodiment of the instant disclosure.

Referring to FIGS. 3 and 4, FIG. 4 shows driving waveform diagram of the single-phase DC motor control circuit corresponding to FIG. 3 according to the embodiment of the instant disclosure. As show in FIG. 4, the phase-changing signal HC' is square wave signal which is periodically and illustrates waveform with two periods T1 and T2 for instructing the instant disclosure, but the phase-changing signal HC' with two periods is not limited in the present embodiment. In the present embodiment, the period is divided into time interval t21 and t22. In the time interval t11 or t21, when the logic circuit 318 detects that voltage level of the phase-changing signal HC' is high voltage level, the logic circuit 318 may correspondingly outputs the second logic signal P2S and the third logic signal N1S with high voltage level, and the logic circuit 318 may concurrently outputs the first logic signal P1S and the fourth logic signal N2S with low voltage level. Next, the switching circuit 316 receives the logic signal P1S and P2S transmitted from the logic circuit 18 and receives the pulse modulation signal PU transmitted from the second comparator DP, so as to output the second direction driving signal D2S, which is opposite to phase of the pulse modulation signal PU to the driving circuit 320, wherein the first direction driving signal D1S is a signal with high voltage level. Afterwards, at the time of receiving the first direction driving signal D1S and the second direction driving signal D2S for the driving circuit 320, the driving circuit 320 still receives the third logic signal N1S with high voltage level and the fourth logic signal N2S with low voltage level, and accordingly modulates the second output signal VOUT2' to the sinusoidal signal with positive half-wave and then transmits the second output signal VOUT2' to the single-phase DC motor 330. It is to be noted that voltage level of the first output signal VOUT1' maintains at the low voltage level in the time interval t11 or t21. In short, the instant disclosure is able to modulate the second output signal VOUT2' to the sinusoidal signal with positive half-wave, mainly through the second output signal VOUT2', wherein phase of the second output signal VOUT2' is opposite to that of the pulse modulation signal PU.

In the other hand, in the time interval t12 or t22, when the logic circuit 318 detects that voltage level of the phase-changing signal HC' is low voltage level, the logic circuit 318 correspondingly outputs the first logic signal P1S and the fourth logic signal N2S with high voltage level and the logic circuit 318 outputs the second logic signal P2S and the third logic signal N1S concurrently. Next, the switching circuit 316 receives the logic signal P1S and P2S transmitted from the logic circuit 318 and receives the pulse modulation signal PU transmitted from the second comparator DP, so as to output the first direction driving signal D1S to the driving circuit 320, wherein phase of the first direction driving signal D1S is opposite to that of the pulse modulation signal PU and the first direction driving signal D1S is a signal with high voltage level. Afterwards, at the time of receiving the first direction driving signal D1S and the second direction driving signal D2S for the driving circuit 320, the driving circuit 320 further receives the third logic signal N1S with low voltage level and the fourth logic signal N2S with high voltage level, and accordingly modulates the first output signal VOUT1' to the sinusoidal signal with positive half-wave and then the driving circuit 320 transmits the first output signal VOUT1' to the single-phase DC motor 330. It is to be noted that voltage level of the second output signal VOUT2' maintains at the low voltage level in the time interval t12 or t22. In short, the instant disclosure is able to modulate the first output signal VOUT1' to the sinusoidal signal with positive half-wave, mainly through the first output signal VOUT1', wherein phase of the second output signal VOUT1' is opposite to that of the pulse modulation signal PU.

It is to be noted that, in the present embodiment, phase difference between the first output signal VOUT1' and the second output signal VOUT2' is 180 degrees, and the first output signal VOUT1' and the second output signal VOUT2' are alternatively transmitted to the single-phase DC motor 330 so as to make the single-phase DC motor 330 operate. Additionally, waveform of the first logic signal P1S is equal to that of the fourth logic signal N2S, and waveform of the second logic signal P2S is equal to that of the third logic signal N1S.

Figure 5:
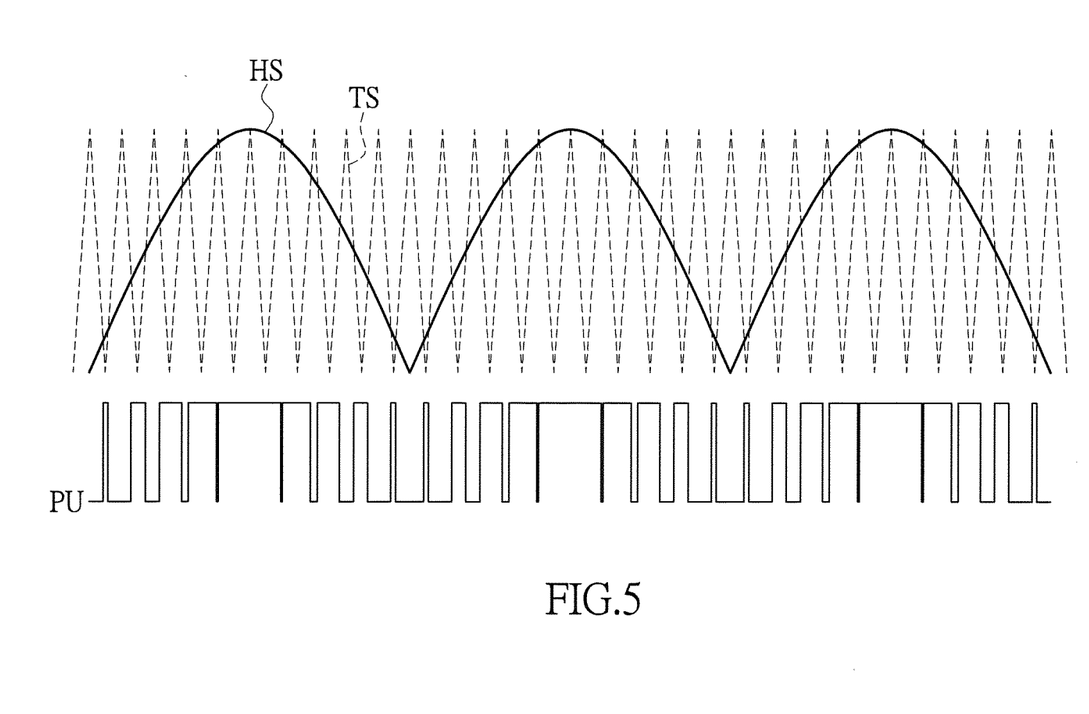
FIG. 5 shows waveform schematic diagram for comparison of the positive full-wave signal and the triangular wave signal according to the embodiment of the instant disclosure.

In more detail, referring to FIGS. 3 and 5, FIG. 5 shows waveform schematic diagram for comparison of the positive full-wave signal and the triangular wave signal according to the embodiment of the instant disclosure. As shown in FIG. 5, when amplitude of the positive full-wave signal HS is larger than or equal to that of the triangular wave signal TS, the first comparator DP outputs the pulse width modulation signal PU with high voltage level. On the contrary, when amplitude of the positive full-wave signal HS is smaller than or equal to that of the triangular wave signal TS, the first comparator DP outputs the pulse width modulation signal PU with low voltage level. Therefore, duty ratio of the pulse width modulation signal PU is gradually increased from zero to a predetermined value and then is gradually decreased from the predetermined value to zero. For example, in one embodiment, duty ratio of the pulse width modulation signal PU is gradually increased from 0% to 100%, and then duty ratio of the pulse width modulation signal PU is gradually decreased from 100% to 0%. In short, duty ratio of the pulse width modulation signal PU is determined by a cross-point formed by the positive full-wave signal HS and the triangular wave signal TS. Accordingly, a person skilled in the art may adaptively change frequency of the triangular wave signal TS or the positive full-wave signal HS according to demand, so as to generate pulse width modulation signal PU with different duty ratio, and frequency of the triangular wave signal TS or the positive full-wave signal HS is not limited in the present embodiment.

Furthermore, when voltage level of the phase-changing signal HC' is high voltage level, phase of the second direction driving signal D2S is opposite to that of the pulse width modulation signal PU (from 0% to 100% to 0%); which means, duty ration of the second direction driving signal D2S is also gradually decreased from 100% to a duty ratio anti-phase value (e.g. 0%) and then is gradually increased from the duty ratio anti-phase value (e.g. 0%) to 100%. In the other hand, when voltage level of the phase-changing signal HC' is low voltage level, phase of the first direction driving signal D1S is opposite to that of the pulse width modulation signal PU (from 0% to 100% to 0%); which means, duty ratio of the first direction driving signal D1S is also gradually decreased from 100% to a duty ratio anti-phase value (e.g. 0%) and then is gradually increased from the duty ratio anti-phase value (e.g. 0%) to 100%. Accordingly, after the first direction driving signal D1S and the second direction driving signal D2S are transmitted to the driving circuit 320 by the switching circuit 316 in different time interval (e.g. t11, t12, t21 and t22), the driving circuit 320 modulates the first output signal VOUT1' to sinusoidal signal with positive half-wave in the time interval t12 and t22, and modulates the second output signal VOUT2' to sinusoidal signal with positive half-wave in the time interval t11 and t21. In the instant disclosure, phase difference between the first output signal VOUT1' and the second output signal VOUT2' is 180 degrees, so the single-phase DC motor control circuit 310 is able to alternatively output the first output signal VOUT1' and the second output signal VOUT2' to the single-phase DC motor 330, so as to make the single-phase DC motor 330 operate and avoid generating phenomenon of sharply changing for current of the single-phase DC motor 330.

For a specific instruction on an operation process of the single-phase DC motor control circuit 310 of the instant disclosure, there is at least one of the embodiments for further instruction.

In the following embodiments, there are only parts different from embodiments in FIG. 3 described, and the omitted parts are indicated to be identical to the embodiments in FIG. 3. In addition, for an easy instruction, similar reference numbers or symbols refer to elements alike.

[Another Embodiment of the Single-Phase DC Motor Control Circuit]

Figure 6:
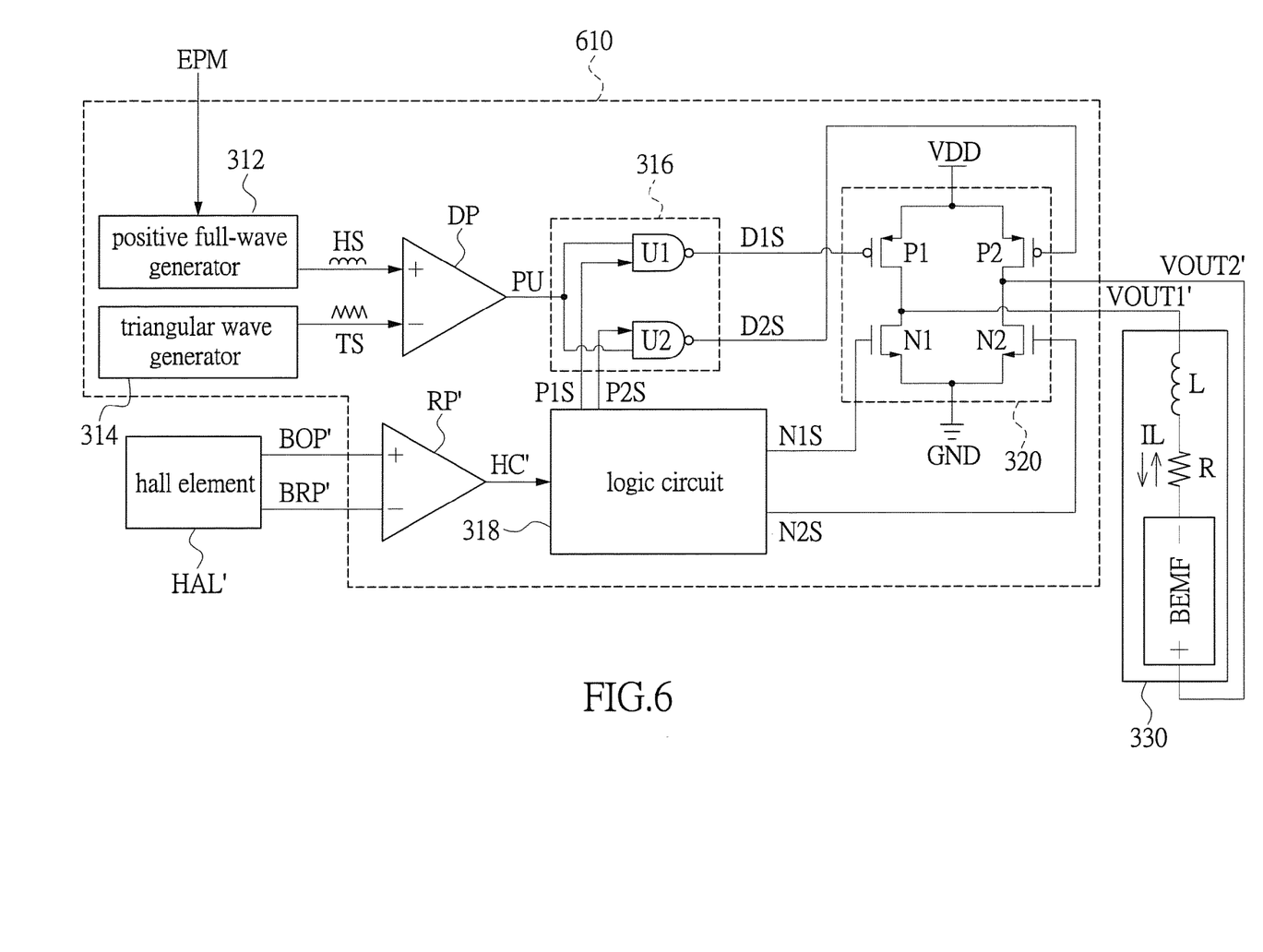
FIG. 6 shows detailed circuit schematic diagram of the single-phase DC motor control circuit according to the embodiment of the instant disclosure.

Referring to FIG. 6, FIG. 6 shows detailed circuit schematic diagram of the single-phase DC motor control circuit according to the embodiment of the instant disclosure. In the present embodiment, difference from above-mentioned embodiment in FIG. 3 is that the switching circuit 316 of the single-phase DC motor control circuit 610 comprises a first NAND gate U1 and a second NAND gate U2, and the driving circuit 318 comprises a first up-bridge transistor P1, a second up-bridge transistor P2, a first down-bridge transistor N1 and a second down-bridge transistor N2. Additionally, the single-phase DC motor control circuit 610 further comprises a second comparator RP'.

An input terminal of the first NAND gate U1 is respectively connected to an output terminal of the first comparator DP and the logic circuit 318, and an output terminal of the first NAND gate U is electrically connected to a gate of the first up-bridge transistor P1 of the driving circuit 320. An input terminal of the second NAND gate U2 is respectively connected to the output terminal of the first comparator DP and the logic circuit 318, and an output terminal of the second NAND gate U2 is electrically connected to a gate of the second up-bridge transistor P2 of the driving circuit 320. Source and gate of the first up-bridge transistor P1 is respectively connected to the system voltage VDD and the output terminal of the second NAND gate U2. Drain and gate of the first down-bridge transistor N1 is respectively connected to drain of the first up-bridge transistor P1 and the logic circuit 318, and source of the first down-bridge transistor N1 is electrically connected to the ground voltage GND. Drain and gate of the second down-bridge transistor N2 is respectively connected to drain of the second up-bridge transistor P2 and the logic circuit 318, and source of the second down-bridge transistor N2 is electrically connected to the ground voltage GND. A positive input terminal of a negative input terminal of the second comparator RP' is electrically connected to a hall element HAL' external, and an output terminal of the second comparator RP' is electrically connected to logic circuit 318.

Regarding the first NAND gate U1, the first NAND gate U1 respectively receives the pulse width modulation signal PU and the first logic signal P1S, and outputs the first direction driving signal D1S to gate of the first up-bridge transistor P1 for controlling switched-on or switched-off state of the first up-bridge transistor P1. In another embodiment, the first NAND gate U1 is also composed from other logic gates, for example, the first NAND gate U1 is also consisted of an and-gate and an inverter.

Regarding the second NAND gate U2, the second NAND gate U2 respectively receives the pulse width modulation signal PU and the second logic signal P2S, and outputs second direction driving signal D2S to gate of the second up-bridge transistor P2 for controlling switched-on or switched-off state of the second up-bridge transistor P2. In another embodiment, the second NAND gate U2 may be also composed from other gates, for example, the second NAND gate U2 is consisted of an and-gate and an inverter.

Regarding the first up-bridge transistor P1, the first up-bridge transistor P1 is served as a switch transistor, and receives the first direction driving signal D1S for determining switched-on or switched-off state itself accordingly, wherein the first up-bridge transistor P1 is P-type metal oxide semiconductor transistor in the present embodiment.

Regarding the second up-bridge transistor P2, the second up-bridge transistor P2 is served as a switch transistor, and receives the second direction driving signal D2S for determining switched-on or switched-off state itself accordingly, wherein the second up-bridge transistor P2 is P-type metal oxide semiconductor transistor in the present embodiment.

Regarding the first down-bridge transistor N1, the first down-bridge transistor N1 is served as a switch transistor, and receives the third logic signal N1S for determining switched-on or switched-off state itself accordingly, wherein the first down-bridge transistor N1 is N-type metal oxide semiconductor transistor in the present embodiment.

Regarding the second down-bridge transistor N2, the second down-bridge transistor N2 is served as a switch transistor, and receives the four logic signal N2S for determining switched-on or switched-off state itself accordingly, wherein the second down-bridge transistor N2 is N-type metal oxide semiconductor transistor in the present embodiment. Moreover, source of the second down-bridge transistor N2 is connected to the ground voltage GND.

Regarding the second comparator RP', the second comparator RP' is used for receiving a first sinusoidal wave signal BOP' and a second sinusoidal wave signal BRP', and accordingly outputs a phase-changing signal HC' to the logic circuit 318, wherein a positive input terminal of the second comparator RP' receives a first sinusoidal wave signal BOP', and a negative input terminal of the second comparator RP' receives a second sinusoidal wave signal BRP'. Additionally, the first sinusoidal wave signal BOP' is a positive-phase sinusoidal wave signal and the second sinusoidal wave signal BRP' is an anti-phase sinusoidal wave signal; which means, phase of the first sinusoidal wave signal BOP' is opposite to that of the second sinusoidal wave signal BRP'. It is worth mentioning that, in the present embodiment, the single-phase DC motor control circuit 610 may be an integrated circuit, wherein the first sinusoidal wave signal BOP' and a second sinusoidal wave signal BRP' are generated from a hall element HAL' external. In another embodiment, the hall element HAL' may be integrated into the single-phase DC motor control circuit 610, so as to generate the first sinusoidal wave signal BOP' and the second sinusoidal wave signal BRP', and thus it is not limited thereto. The hall element HAL' is used for detecting a magnetic pole position of an inner rotor of the single-phase DC motor 330 so as to correspondingly generate the first sinusoidal wave signal BOP' and the second sinusoidal wave signal BRP'. Additionally, in the present embodiment, the single-phase DC motor 330 is represented with an equivalent inductor L, an equivalent resistor R and a reaction force BEMF.

Figure 7:
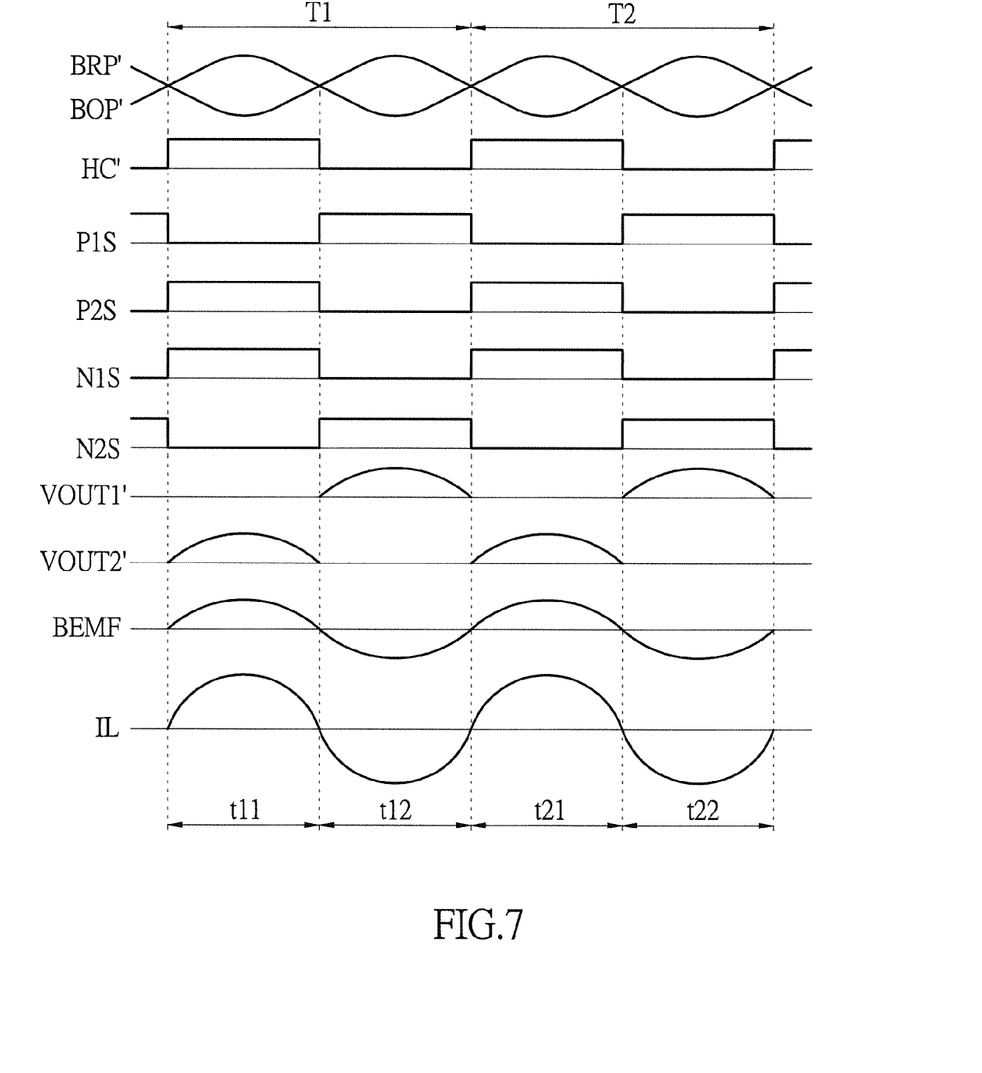
FIG. 7 shows waveform schematic diagram of output signal for the single-phase DC motor control circuit in FIG. 6 according to the embodiment of the instant disclosure.

There is further instruction in teaching an operation mechanism of the single-phase DC motor control circuit 610, for further understanding of the instant disclosure Referring to FIGS. 6 and 7, FIG. 7 shows waveform schematic diagram of output signal for the single-phase DC motor control circuit in FIG. 6 according to the embodiment of the instant disclosure. As shown in FIG. 7, when amplitude of the first sinusoidal wave signal BOP' is larger than that of the second sinusoidal wave signal BRP', the second comparator RP' outputs phase-changing signal HC' with high voltage level. When amplitude of the first sinusoidal wave signal BOP' is smaller than that of the second sinusoidal wave signal BRP', the second comparator RP' outputs phase-changing signal HC' with low voltage level. In short, duty ratio of the phase-changing signal HC' is determined by a cross-point formed by the first sinusoidal wave signal BOP' and the second sinusoidal wave signal BRP', wherein the cross-point is a time-point changed from the first output signal VOUT1' to the second output signal VOUT2' outputted from the driving circuit 320, or a time-point changed from the second output signal VOUT2' to the first output signal VOUT1' outputted from the driving circuit 320.

When voltage level of the phase-changing signal HC' is low voltage level (i.e. in the time interval t12 and t22), the logic circuit 318 outputs logic signals P1S and N2S with high voltage level and logic signals P2S and N1S with high voltage level. Furthermore, the first NAND gate U1 receives the first logic signal P1S with high voltage level transmitted from the logic circuit 318 and the pulse width modulation signal PU transmitted from the first comparator DP, and accordingly outputs the first direction driving signal D1S to gate of the first up-bridge transistor P1 for modulating the first output signal VOUT1', wherein phase of the first direction driving signal D1S is opposite to that of the pulse width modulation signal PU. The second NAND gate U2 receives the second logic signal P2S with low voltage level transmitted from the logic circuit 318 and the pulse width modulation signal PU transmitted from the first comparator DP, and accordingly outputs the second direction driving signal D2S to gate of the second up-bridge transistor P2 so as to turn off the second up-bridge transistor P2

Meanwhile, the second down-bridge transistor N2 receives the fourth logic signal N2S with high voltage level and accordingly enters into switched-on state, and the first down-bridge transistor N1 receive the third logic signal N1S with low voltage level so as to enter into switched-off state. In other words, when voltage level of the first direction driving signal D1S is low voltage level, the first up-bridge transistor P1 may be switched-on so that there is a first current channel between the first up-bridge transistor P1 and the second down-bridge transistor N2 for generating a single-phase DC motor current IL flowing through the equivalent inductor L and the equivalent resistor R. Because the first direction driving signal D1S has different duty ratios, conduction time of the first up-bridge transistor P1 and current value of the single-phase DC motor current IL may be different with different duty ratios, so that the first output signal VOUT1' generated from drain of the first up-bridge transistor P1 may be modulated to sinusoidal signal with positive half-wave.

In the other hand, when voltage level of the phase-changing signal HC' is high voltage level (i.e. in the time interval t11 and t21), the logic circuit 318 outputs logic signals P1S and N2S with low voltage level and logic signals P2S and N1S with high voltage level. Furthermore, the first NAND gate U1 receives the first logic signal P1S with low voltage level transmitted from the logic circuit 318 and receives the pulse width modulation signal PU transmitted from the first comparator DP, and accordingly outputs the first direction driving signal D1S with high voltage level to gate of the first up-bridge transistor P1 so as to turn off the first up-bridge transistor P1. The second NAND gate U2 receives the second logic signal P2S with high voltage level transmitted from the logic circuit 318 and receives the pulse width modulation signal PU transmitted from the first comparator DP, and accordingly outputs the second direction driving signal D2S to gate of the second up-bridge transistor P2 for modulating the second output signal VOUT2', wherein phase of the second direction driving signal D2S is opposite to that of the pulse width modulation signal PU.

Meanwhile, the first down-bridge transistor N1 receives the third logic signal N1S with high voltage level and accordingly enters into switched-on state, and the second down-bridge transistor N2 receives the fourth logic signal N2S with low voltage level and accordingly enters into switched-off state. In other words, when voltage level of the second direction driving signal D2S is low voltage level, the second up-bridge transistor P2 may be switched-on so that there is a second current channel generated between the second up-bridge transistor P2 and the first down-bridge transistor N1 for generating a single-phase DC motor current IL flowing through the equivalent inductor L and the equivalent resistor R. Because the second direction driving signal D2S has different duty ratios, conduction time of the second up-bridge transistor P2 and current value of the single-phase DC motor current IL may be different with different duty ratios, so that the second output signal VOUT2' generated from drain of the second up-bridge transistor P2 may be modulated to sinusoidal signal with positive half-wave.

It is worth to be noticed that duty ratio of the pulse width modulation signal PU is gradually increased from zero to a predetermined value and then is gradually decreased from the predetermined value to zero, so the first direction driving signal D1S and the second direction driving signal D2S have the same characteristic. Accordingly, when the first direction driving signal D1S is transmitted to the first up-bridge transistor P1 (i.e. when voltage level of the phase-changing signal HC' is low voltage level), single-phase DC motor control circuit 610 may correspondingly modulate the first output signal VOUT1' to sinusoidal signal with positive half-wave. Moreover, the single-phase DC motor control circuit 610 is able to make the driving circuit 320 alternatively output the first output signal VOUT1' and the second output signal VOUT2' correspondingly, through voltage level of the phase-changing signal HC' detected by the logic circuit 318.

It is worth to be noted that after subtraction of an equivalent sinusoidal signal and the reaction force BEMF with sinusoidal waveform, waveform of the single-phase DC motor current IL may be a sinusoidal signal which is continuous and smooth, wherein the equivalent sinusoidal signal is consisted of the first output signal VOUT1' and the second output signal VOUT2'. Accordingly, the single-phase DC motor control circuit 610, in the present embodiment, is able to smoothing the single-phase DC motor current in the prior art so as to improve phenomenon of sharply changing as changing phase and further reduce noise generated form rotation of the single-phase DC motor 330.

[Another Embodiment of the Single-Phase DC Motor Control Circuit]

Figure 8:
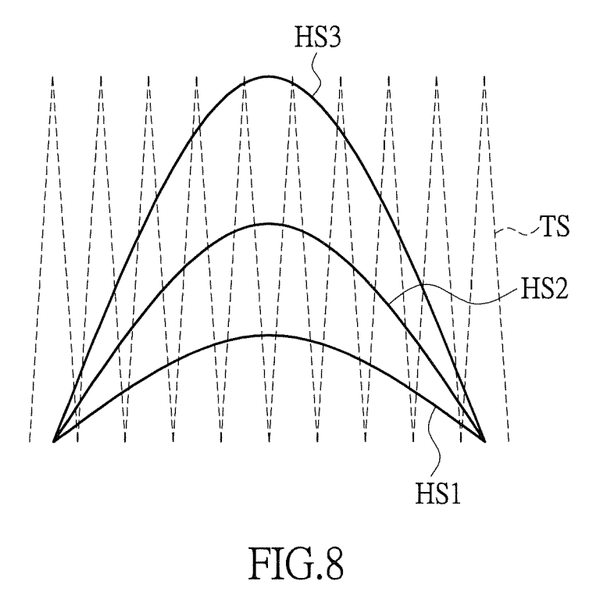
FIG. 8 shows wave schematic diagram of positive full-wave signals with different amplitudes generated from the positive full-wave generator via receiving amplitude modulation signals with different amplitudes, according to another embodiment of the instant disclosure.

Referring to FIGS. 6 and 8, FIG. 8 shows wave schematic diagram of positive full-wave signals with different amplitudes generated from the positive full-wave generator via receiving amplitude modulation signals with different amplitudes, according to another embodiment of the instant disclosure. In the present embodiment, the positive full-wave generator 312 may respectively generate the positive full-wave signal HS1, HS2 and HS3 with different amplitude according the amplitude modulation signal EPM. Under the condition of providing the same triangular wave signal TS, after comparison operation of the first comparator DP for the positive full-wave signal HS1, HS2 and HS3 with different amplitude, the pulse width modulation signal PU with different maximum duty ratio may be acquired; which means maximum duty ratio of the positive full-wave signal HS1, HS2 and HS3 are different from each other. For example, amplitude ratio of the positive full-wave signal HS1, HS2 and HS3 is 1:2:4, and ratio of maximum duty ratio for the pulse width modulation signal PU correspondingly is 25%:50%:100%, wherein maximum amplitude of the positive full-wave signal HS3 is equal to amplitude of the triangular wave signal TS.

Therefore, amplitudes of the first output signal VOUT1' and the second output signal VOUT2' may also be correspondingly changed. In short, when amplitude of the positive full-wave signal HS decrease, amplitudes of the first output signal VOUT1' and the second output signal VOUT2' are also be correspondingly decreased, so as to change rotation speed of the single-phase DC motor 330 correspondingly.

[One Embodiment of the Control Method for the Single-Phase DC Motor]

Figure 9:
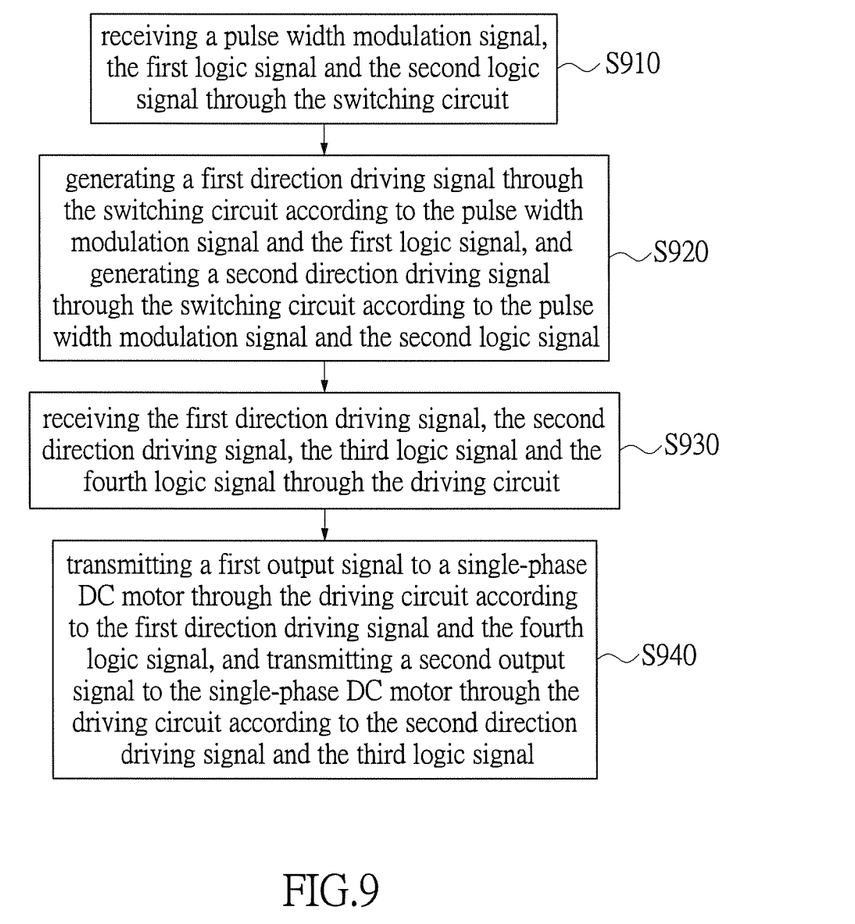
FIG. 9 shows a flow chart of the control method for the single-phase DC motor according to one embodiment of the instant disclosure.

Referring to FIG. 9, FIG. 9 shows a flow chart of the control method for the single-phase DC motor according to one embodiment of the instant disclosure. An explanatory sequence of steps in the present embodiment may be embodied with the single-phase DC motor control circuit 310 as shown in FIG. 3 or the single-phase DC motor control circuit 610 in FIG. 6, and thus please refer to FIGS. 1~8 for an easy understanding. The control method for the single-phase DC motor comprises steps as follows:

In the step S910: the switching circuit 320 receives the pulse width modulation signal PU, the first logic signal P1S and the second logic signal P2S.

In the step S920: the switching circuit 302 generates the first direction driving signal D1S according to the pulse width modulation signal PU and the first logic signal P1S, and the switching circuit 302 generates the second direction driving signal D2S according to the pulse width modulation signal PU and the second logic signal P1S.

In the step S930: the driving circuit 320 receives the first direction driving signal D1S, the second direction driving signal D2S, the third logic signal N1S and the fourth logic signal N2S.

In the step S940: the driving circuit 320 transmits the first output signal VOUT1' to the single-phase DC motor 330 according to the first direction driving signal D1S and the fourth logic signal N2S, and the driving circuit 320 transmits the second output signal VOUT2' to the single-phase DC motor 330 according to the second direction driving signal D2S and the third logic signal N1S.

Relevant details of the steps of the control method for single-phase DC motor are described in the embodiments of FIGS. 1-8, and thus it is not repeated thereto. It is clarified that, a sequence of steps in FIG. 9 is set for a need to instruct easily, and thus the sequence of the steps is not used as a condition in demonstrating the embodiments of the instant disclosure.

[One Embodiment of the Fan System with the Single-Phase DC Motor Control Circuit]

Figure 10:
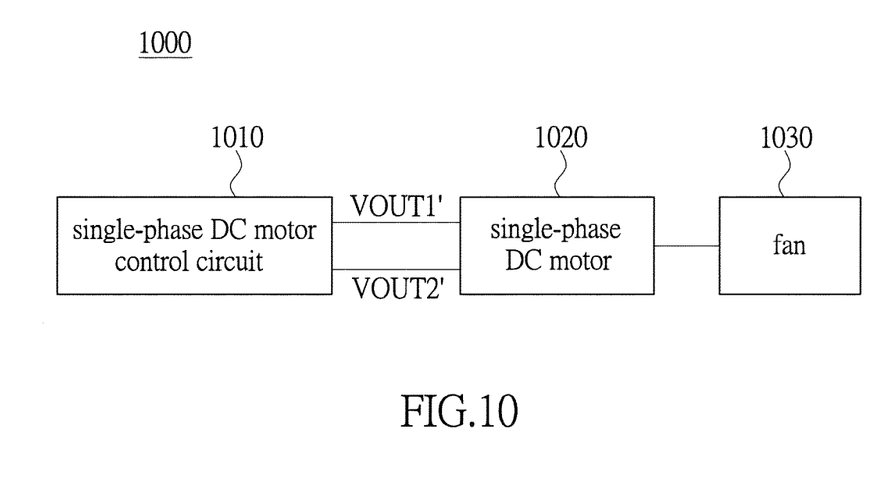
FIG. 10 shows block schematic view of the fan system according to the embodiment of the instant disclosure.

Referring to FIG. 10, FIG. 10 shows block schematic view of the fan system according to the embodiment of the instant disclosure. The fan system 1000 comprises a single-phase DC motor control circuit 1010, a single-phase DC motor 1020 and a fan 1030. The single-phase DC motor control circuit 1010 may be one of single-phase DC motor control circuit 310 and 610 in the former embodiments. The single-phase DC motor control circuit 1010 is used for outputting the first output signal VOUT1' and the second output signal VOUT2'. The single-phase DC motor 1020 is connected to the single-phase DC motor control circuit 1010, and the single-phase DC motor 1020 receives the first output signal VOUT1' and the second output signal VOUT2'. The fan 1030 is connected to the single-phase DC motor 1020. In the present embodiment, the fan system drives the single-phase DC motor 1020 so as to make the fan 1030 operate through utilizing the single-phase DC motor control circuit above-mentioned.

To sum up, the fan system, the single-phase DC motor control circuit and control method thereof provided by the instant disclosure are able to smoothing output current of the single-phase DC motor in the prior art, so as to improve phenomenon of sharply changing about saddle-type current of the single-phase DC motor in the prior art and reduce noise generated from rotation of the single-phase DC motor.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A single-phase DC motor control circuit, comprising:
a logic circuit, connected to a phase-changing signal, for detecting voltage level of the phase-changing signal and outputting a first logic signal, a second logic signal, a third logic signal and a fourth logic signal, wherein phase of the first logic signal is opposite to that of the second logic signal;
a switching circuit, connected to the logic circuit, for receiving a pulse width modulation signal, the first logic signal, the second logic signal, wherein the switching circuit generates a first direction driving signal according to the pulse width modulation signal and the first logic signal, and generates a second direction driving signal according to the pulse width modulation signal and the second logic signal; and
a driving circuit, connected to the logic circuit and the switching circuit, for receiving the first direction driving signal and the fourth logic signal and accordingly transmitting a first output signal to a single-phase DC motor, and the driving circuit receiving the second direction driving signal and the third logic signal and accordingly transmitting a second output signal to the single-phase DC motor;
wherein the first output signal and the second output signal are sinusoidal signal with positive half-wave, and phase difference between the first output signal and the second output signal is 180 degrees.

2. The single-phase DC motor control circuit according to claim 1, further comprising:
a positive full-wave generator, outputting a positive full-wave signal, wherein waveform of the positive full-wave signal is sinusoidal wave;

a triangular wave generator, outputting a triangular wave signal, wherein amplitude of the triangular wave signal is larger than or equal to that of the positive full-wave signal; and a first comparator, connected to the positive full-wave generator and the triangular wave generator, for receiving the positive full-wave signal and the triangular wave signal, wherein the first comparator compares the positive full-wave signal with the triangular wave signal so as to the pulse width modulation signal.

3. The single-phase DC motor control circuit according to claim 1, wherein when voltage level of the first logic signal is high voltage level, phase of the first direction driving signal is opposite to that of the pulse width modulation signal; and when voltage level of the first logic signal is low voltage level, voltage level of the first direction driving signal is high voltage level.

4. The single-phase DC motor control circuit according to claim 1, wherein when voltage level of the second logic signal is high voltage level, phase of the second direction driving signal is opposite to that of the pulse width modulation signal; and when voltage level of the second logic signal is low voltage level, voltage level of the second direction driving signal is high voltage level.

5. The single-phase DC motor control circuit according to claim 1, wherein waveform of the first logic signal is equal to that of the fourth logic signal, and waveform of the second logic signal is equal to that of the three logic signal.

6. The single-phase DC motor control circuit according to claim 1, wherein when voltage level of the phase-changing signal is low voltage level, voltage level of the first and fourth logic signal is high voltage level so that phase of the first direction driving signal is opposite to that of the pulse width modulation signal and the driving circuit outputs the first output signal; and when phase of the phase-changing signal is high voltage level, voltage level of the second and the third logic signal is high voltage level so that phase of the second direction driving signal is opposite to the pulse width modulation signal and the driving circuit outputs the second output signal.

7. The single-phase DC motor control circuit according to claim 1, wherein the switching circuit comprises:

a first NAND gate, input terminal of the first NAND gate respectively connected to the first comparator and the logic circuit so as to receive the pulse width modulation signal and the first logic signal respectively, and output terminal of the first NAND gate outputting the first direction driving signal to the driving circuit; and a second NAND gate, input terminal of the second NAND gate respectively connected to the first comparator and the logic circuit so as to receive the pulse width modulation signal and the second logic signal respectively, and output terminal of the second NAND gate outputting the second direction driving signal to the driving circuit.

8. The single-phase DC motor control circuit according to claim 6, wherein the driving circuit comprises:

a first up-bridge transistor, having a source connected to a system voltage, having a gate connected to output terminal of the first NAND gate so as to receive the first direction driving signal and accordingly determining switched-on or switched-off state;

a second up-bridge transistor, having a source connected to the system voltage, having a gate connected to output terminal of the second NAND gate so as to receive the second direction driving signal and accordingly determining switched-on or switched-off state;

a first down-bridge transistor, having a drain connected to a drain of the first up-bridge transistor, having a gate connected to the logic circuit so as to receive the third logic signal and accordingly determining switched-on or switched-off state, having a source connected to a ground voltage; and a second down-bridge transistor, having a drain connected to a drain of the second up-bridge transistor, having a gate connected to the logic circuit so as to receive the fourth logic signal and accordingly determining switched-on or switched-off state, having a source connected to the ground voltage.

9. The single-phase DC motor control circuit according to claim 7, wherein when voltage level of the phase-changing signal is low voltage level, there is a first current channel generated between the first up-bridge transistor and the second down-bridge transistor and the drain of the first up-bridge transistor outputs the first output signal; and when voltage level of the phase-changing signal is high voltage level, there is a second current channel generated between the second up-bridge transistor and the first down-bridge transistor and the drain of the second up-bridge transistor outputs the second output signal.

10. The single-phase DC motor control circuit according to claim 1, further comprising:

a second comparator, connected between a hall element and the logic circuit, the second comparator receiving a first sinusoidal wave signal and a second sinusoidal wave signal, and comparing the first sinusoidal wave signal with the second sinusoidal wave signal so as to output the phase-changing signal, wherein phase of the first sinusoidal wave signal is opposite to that of the second sinusoidal wave signal and the first and the second sinusoidal wave signal are outputted from the hall element.

11. The single-phase DC motor control circuit according to claim 1, wherein the positive full-wave generator receives an amplitude modulation signal and accordingly modulates amplitude of the positive full-wave signal, wherein when amplitude of the positive full-wave signal decreases, amplitude of the first output signal and the second output signal are also decrease correspondingly.

12. A control method for single-phase DC motor, used for a single-phase DC motor control circuit, the single-phase DC motor control circuit comprising a logic circuit, a switching circuit and a driving circuit, wherein the logic circuit is connected to a phase-changing signal and is used for detecting voltage level of the phase-changing signal, and then outputs a first logic signal, a second logic signal, a third logic signal and a fourth logic signal, and the switching circuit is connected to the first comparator and the logic circuit, and the driving circuit is connected to the logic circuit and the switching circuit, the control method for single-phase DC motor comprising:

receiving a pulse width modulation signal, the first logic signal and the second logic signal through the switching circuit;

generating a first direction driving signal through the switching circuit according to the pulse width modulation signal and the first logic signal, and generating a second direction driving signal through the switching circuit according to the pulse width modulation signal and the second logic signal;

receiving the first direction driving signal, the second direction driving signal, the third logic signal and the fourth logic signal through the driving circuit; and transmitting a first output signal to a single-phase DC motor through the driving circuit according to the first direction driving signal and the fourth logic signal, and transmitting a second output signal to the single-phase DC motor through the driving circuit according to the second direction driving signal and the third logic signal;

wherein the first output signal and the second output signal are sinusoidal signal with positive half-wave, and phase difference between the first output signal and the second output signal is 180 degrees.

13. The control method for single-phase DC motor according to claim 12, wherein the single-phase DC motor control circuit comprises:
    a positive full-wave generator, outputting a positive full-wave signal, wherein waveform of the positive full-wave signal is sinusoidal wave;
    a triangular wave generator, outputting a triangular wave signal, wherein amplitude of the triangular wave signal is larger than or equal to that of the positive full-wave signal; and
    a first comparator, connected to the positive full-wave generator and the triangular wave generator, for receiving the positive full-wave signal and the triangular wave signal, wherein the first comparator compares the positive full-wave signal with the triangular wave signal so as to the pulse width modulation signal.

14. The control method for single-phase DC motor according to claim 12, wherein when voltage level of the first logic signal is high voltage level, phase of the first direction driving signal is opposite to that of the pulse width modulation signal; and when voltage level of the first logic signal is low voltage level, voltage level of the first direction driving signal is high voltage level.

15. The control method for single-phase DC motor according to claim 12, wherein when voltage level of the second logic signal is high voltage level, phase of the second direction driving signal is opposite to that of the pulse width modulation signal; and when voltage level of the second logic signal is low voltage level, voltage level of the second direction driving signal is high voltage level.

16. The control method for single-phase DC motor according to claim 12, wherein waveform of the first logic signal is equal to that of the fourth logic signal, and waveform of the second logic signal is equal to that of the three logic signal.

17. The control method for single-phase DC motor according to claim 12, wherein when voltage level of the phase-changing signal is low voltage level, voltage level of the first and fourth logic signal is high voltage level so that phase of the first direction driving signal is opposite to that of the pulse width modulation signal and the driving circuit outputs the first output signal; and when phase of the phase-changing signal is high voltage level, voltage level of the second and the third logic signal is high voltage level so that phase of the second direction driving signal is opposite to the pulse width modulation signal and the driving circuit outputs the second output signal.

18. The control method for single-phase DC motor according to claim 12, wherein the switching circuit comprises:
    a first NAND gate, input terminal of the first NAND gate respectively connected to the first comparator and the logic circuit so as to receive the pulse width modulation signal and the first logic signal respectively, and output terminal of the first NAND gate outputting the first direction driving signal to the driving circuit; and
    a second NAND gate, input terminal of the second NAND gate respectively connected to the first comparator and the logic circuit so as to receive the pulse width modulation signal and the second logic signal respectively, and output terminal of the second NAND gate outputting the second direction driving signal to the driving circuit.

19. The control method for single-phase DC motor according to claim 18, wherein the driving circuit comprises:
    a first up-bridge transistor, having a source connected to a system voltage, having a gate connected to output terminal of the first NAND gate so as to receive the first direction driving signal and accordingly determining switched-on or switched-off state;
    a second up-bridge transistor, having a source connected to the system voltage, having a gate connected to output terminal of the second NAND gate so as to receive the second direction driving signal and accordingly determining switched-on or switched-off state;
    a first down-bridge transistor, having a drain connected to a drain of the first up-bridge transistor, having a gate connected to the logic circuit so as to receive the third logic signal and accordingly determining switched-on or switched-off state, having a source connected to a ground voltage; and
    a second down-bridge transistor, having a drain connected to a drain of the second up-bridge transistor, having a gate connected to the logic circuit so as to receive the fourth logic signal and accordingly determining switched-on or switched-off state, having a source connected to the ground voltage.

20. A fan system, comprising:
    a single-phase DC motor control circuit, outputting a first output signal and a second output signal;
    a single-phase DC motor, connected to the single-phase DC motor control circuit and receiving a first output signal and a second output signal; and
    a fan, connected to the single-phase DC motor;
    wherein the fan system drives the single-phase DC motor so as to make the fan operate through the control method for single-phase DC motor according to claim 12.

* * * * *